United States Patent
Shukla et al.

(10) Patent No.: US 10,361,925 B1
(45) Date of Patent: Jul. 23, 2019

(54) STORAGE INFRASTRUCTURE SCENARIO PLANNING

(71) Applicant: Nutanix, Inc., San Jose, CA (US)

(72) Inventors: Himanshu Shukla, San Jose, CA (US); Bharat Kumar Beedu, Bangalore (IN); Abhinay Nagpal, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/191,387

(22) Filed: Jun. 23, 2016

(51) Int. Cl.
 *H04L 12/24* (2006.01)
 *H04L 29/08* (2006.01)

(52) U.S. Cl.
 CPC .......... *H04L 41/147* (2013.01); *H04L 41/22* (2013.01); *H04L 67/1097* (2013.01)

(58) Field of Classification Search
 CPC .... H04L 41/147; H04L 41/22; H04L 67/1097
 USPC ................................................. 709/224, 200
 See application file for complete search history.

(56) References Cited

U.S. PATENT DOCUMENTS

| | | | |
|---|---|---|---|
| 7,953,843 B2 | 5/2011 | Cherkasova | |
| 8,060,599 B2 | 11/2011 | Cherkasova et al. | |
| 8,104,041 B2 | 1/2012 | Belady et al. | |
| 8,291,411 B2 | 10/2012 | Beaty et al. | |
| 8,326,970 B2 | 12/2012 | Cherkasova et al. | |
| 8,464,254 B1 | 6/2013 | Vohra et al. | |
| 8,533,222 B2 | 9/2013 | Breckenridge et al. | |
| 8,549,518 B1 | 10/2013 | Aron et al. | |
| 8,560,671 B1 | 10/2013 | Yahalom et al. | |
| 8,601,473 B1 | 12/2013 | Aron et al. | |
| 8,626,902 B2 | 1/2014 | Singh et al. | |
| 8,850,130 B1 | 9/2014 | Aron et al. | |
| 8,863,124 B1 | 10/2014 | Aron | |
| 8,997,097 B1 | 3/2015 | Aron et al. | |
| 9,015,122 B2 | 4/2015 | Harrison et al. | |
| 9,032,077 B1 | 5/2015 | Klein et al. | |

(Continued)

OTHER PUBLICATIONS

A. Nagpal et al., "STAY-FIT: Seasonal Time series Analysis and Forecasting using Tournament Selection", 3 pages; Nutanix, Inc., San Jose, CA. USA. {anagpal,cong.liu,jwen,hshukla,iskrena.georgie,isha.singhal,shuo.yang}@nutanix.com.

(Continued)

*Primary Examiner* — El Hadji M Sall
(74) *Attorney, Agent, or Firm* — Vista IP Law Group, LLP

(57) ABSTRACT

Systems and methods for "what-if" scenario planning of a distributed data storage system. A scenario planning engine has a user interface to facilitate user interactions to describe "what if" scenarios. A method comprises steps to collect system performance measurements pertaining to measurable characteristics of the distributed storage system. A predictive model is generated and formatted for use as a predictor of one or more predictive model parameters that are derived from the collected system performance measurements and/or any calculated predictions and/or correlations. A user can vary a set of scenario input parameters so as to characterize one or more "what if" scenarios. The user-defined scenario input parameters are formatted and used as predictive model inputs. The predictive model is used to simulate predicted system performance parameters corresponding to respective "what-if" planning scenarios. A user interface is provided to present a graphical depiction of predicted system performance corresponding to the scenarios.

28 Claims, 12 Drawing Sheets

(56) References Cited

U.S. PATENT DOCUMENTS

| | | | |
|---|---|---|---|
| 9,047,083 | B2 | 6/2015 | Gupta et al. |
| 9,052,936 | B1 | 6/2015 | Aron et al. |
| 9,083,581 | B1 | 7/2015 | Addepalli et al. |
| 9,152,643 | B2 | 10/2015 | Whitehead et al. |
| 9,154,589 | B1 | 10/2015 | Klein et al. |
| 9,210,100 | B2 | 12/2015 | Van Der et al. |
| 9,256,374 | B1 | 2/2016 | Aron et al. |
| 9,256,475 | B1 | 2/2016 | Aron et al. |
| 9,317,223 | B2 | 4/2016 | Reohr et al. |
| 9,336,031 | B2 | 5/2016 | Hackett et al. |
| 9,354,912 | B1 | 5/2016 | Aron et al. |
| 9,389,887 | B1 | 7/2016 | Aron et al. |
| 9,405,569 | B2 | 8/2016 | Greden et al. |
| 9,417,903 | B2 | 8/2016 | Bello et al. |
| 9,563,697 | B1 | 2/2017 | Caplan |
| 9,575,784 | B1 | 2/2017 | Aron et al. |
| 9,595,054 | B2 | 3/2017 | Jain et al. |
| 9,619,257 | B1 | 4/2017 | Aron et al. |
| 9,619,261 | B2 | 4/2017 | Gaurav et al. |
| 9,626,275 | B1 | 4/2017 | Hitchcock et al. |
| 9,641,385 | B1 | 5/2017 | Daniel et al. |
| 9,665,386 | B2 | 5/2017 | Bayapuneni et al. |
| 9,705,817 | B2 | 7/2017 | Lui et al. |
| 9,772,866 | B1 | 9/2017 | Aron et al. |
| 9,817,719 | B2 | 11/2017 | Dain et al. |
| 9,836,229 | B2 | 12/2017 | D'sa et al. |
| 9,842,153 | B2 | 12/2017 | Bishop |
| 9,882,969 | B2 | 1/2018 | Reddy et al. |
| 9,886,215 | B1 | 2/2018 | Ramachandran et al. |
| 9,933,979 | B2 | 4/2018 | Gu et al. |
| 9,959,188 | B1 | 5/2018 | Krishnan |
| 9,961,017 | B2 | 5/2018 | Jacob et al. |
| 1,006,772 | A1 | 9/2018 | Lakshman |
| 1,012,723 | A1 | 11/2018 | Krishnan et al. |
| 1,029,649 | A1 | 5/2019 | Davis et al. |
| 2004/0205206 | A1 | 10/2004 | Naik et al. |
| 2006/0010101 | A1 | 1/2006 | Suzuki et al. |
| 2006/0053262 | A1 | 3/2006 | Prahlad et al. |
| 2006/0218551 | A1 | 9/2006 | Berstis et al. |
| 2006/0224823 | A1 | 10/2006 | Morley et al. |
| 2007/0136402 | A1 | 6/2007 | Grose et al. |
| 2008/0005468 | A1 | 1/2008 | Faibish et al. |
| 2008/0147934 | A1 | 6/2008 | Nonaka et al. |
| 2008/0295096 | A1 | 11/2008 | Beaty et al. |
| 2008/0320482 | A1 | 12/2008 | Dawson et al. |
| 2009/0288084 | A1 | 11/2009 | Astete et al. |
| 2009/0319582 | A1 | 12/2009 | Simek et al. |
| 2010/0121828 | A1 | 5/2010 | Wang |
| 2010/0217651 | A1* | 8/2010 | Crabtree ............... G06Q 10/00 705/7.22 |
| 2010/0275058 | A1 | 10/2010 | Hashimoto et al. |
| 2011/0185355 | A1 | 7/2011 | Chawla et al. |
| 2011/0202657 | A1 | 8/2011 | Chang et al. |
| 2012/0041914 | A1* | 2/2012 | Tirunagari ............ G06F 12/121 706/15 |
| 2012/0109619 | A1 | 5/2012 | Gmach et al. |
| 2013/0054910 | A1 | 2/2013 | Vaghani et al. |
| 2013/0086341 | A1 | 4/2013 | Vasavi et al. |
| 2013/0174152 | A1 | 7/2013 | Yu |
| 2014/0082614 | A1 | 3/2014 | Klein et al. |
| 2014/0157260 | A1 | 6/2014 | Balani et al. |
| 2014/0282525 | A1 | 9/2014 | Sapuram et al. |
| 2014/0344453 | A1 | 11/2014 | Varney et al. |
| 2015/0106578 | A1 | 4/2015 | Warfield et al. |
| 2015/0169291 | A1 | 6/2015 | Dube et al. |
| 2015/0234869 | A1 | 8/2015 | Chan et al. |
| 2015/0341223 | A1 | 11/2015 | Shen et al. |
| 2015/0350102 | A1 | 12/2015 | Leon-garcia et al. |
| 2015/0379429 | A1 | 12/2015 | Lee et al. |
| 2016/0019094 | A1 | 1/2016 | Habdank et al. |
| 2016/0048337 | A1 | 2/2016 | Prahlad et al. |
| 2016/0048408 | A1 | 2/2016 | Madhu et al. |
| 2016/0203176 | A1 | 7/2016 | Mills |
| 2016/0224384 | A1 | 8/2016 | Gokhale et al. |
| 2016/0232450 | A1 | 8/2016 | Chen et al. |
| 2016/0300142 | A1 | 10/2016 | Feller et al. |
| 2016/0359955 | A1 | 12/2016 | Gill et al. |
| 2016/0373377 | A1 | 12/2016 | Cao et al. |
| 2016/0379125 | A1 | 12/2016 | Bordawekar et al. |
| 2017/0031816 | A1 | 2/2017 | Lee et al. |
| 2017/0364307 | A1 | 12/2017 | Lomelino et al. |
| 2017/0364387 | A1 | 12/2017 | Ahmed et al. |
| 2018/0046487 | A1 | 2/2018 | Matters et al. |
| 2018/0060134 | A1 | 3/2018 | Bianchini et al. |
| 2018/0225139 | A1 | 8/2018 | Hahn et al. |
| 2019/0146707 | A1 | 5/2019 | Fetik |

OTHER PUBLICATIONS

Dlessner, "STAY-FIT: Getting Ready for What Is Next in Prism", 4 pages; Nutanix, Inc. San Jose, CA USA. http://itbloodpressure.com/2015/12/08/stay-fit-getting-ready-for-what-is . . . .

U.S. Appl. No. 15/173,577, filed Jun. 3, 2016, 102 pages.

U.S. Appl. No. 15/006,435, filed Jan. 26, 2016, 65 pages.

Wikipedia. "Feasible region". Nov. 16, 2015. 2 pages.

"What Is Multiobjective Optimization?" Feb. 16, 2015. 1 page. http://www.mathworks.com/help/gads/what-is-multiobjective-optimization.html.

Massimiliano Caramia et al. "Multi-objective Optimization". 2008. 27 pages. Chapter 2. Springer-Verlag London.

Wikipedia. "Gittins index". Dec. 7, 2015. 6 pages.

Pandelis et al. "On the optimality of the Gittins index rule for multi-armed bandits with multiple plays". Jul. 1999. 13 pages.

Deel et al. "Linear Tape File System (LTFS) Format Specification". Dec. 21, 2013. 69 pages.

Non-Final Office Action dated Nov. 14, 2017 for related U.S. Appl. No. 15/186,235.

Non-Final Office Action dated Nov. 27, 2017 for related U.S. Appl. No. 15/160,246.

Final Office Action dated Mar. 30, 2018 for related U.S. Appl. No. 15/160,246.

Notice of Allowance dated May 16, 2018 for related U.S. Appl. No. 15/186,235.

Non-Final Office Action dated May 24, 2018 for related U.S. Appl. No. 15/351,388.

Non-Final Office Action dated Jun. 8, 2018 for related U.S. Appl. No. 15/298,149.

Notice of Allowance dated Aug. 15, 2018 for related U.S. Appl. No. 15/160,246.

Non-Final Office Action dated Sep. 6, 2018 for related U.S. Appl. No. 15/283,004, 5 pages.

Non-Final Office Action dated Jun. 29, 2018 for related U.S. Appl. No. 15/352,495.

Mei et al., Performance Analysis of Network I/O Workload in Virtualized Data Centers, 2010, IEEE, pp. 1-16 (Year: 2010).

Paul et al., Performance Monitoring and Capacity Planning, 2006, VMWorld, pp. 1-39 Centers (Year: 2006).

U.S. Appl. No. 15/298,107, filed Oct. 19, 2016, 57 pages.

U.S. Appl. No. 15/341,549, filed Nov. 2, 2016, 90 pages.

U.S. Appl. No. 15/006,416, filed Jan. 26, 2016, 64 pages.

Notice of Allowance dated Oct. 18, 2018 for related U.S. Appl. No. 15/298,149, 5 pages.

Final Office Action dated Nov. 16, 2018 for related U.S. Appl. No. 15/351,388, 19 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Final Office Action dated Feb. 15, 2019 for related U.S. Appl. No. 15/352,495, 22 pages.
Notice of Allowance dated Feb. 21, 2019 for related U.S. Appl. No. 15/283,004, 5 pages.
Non-Final Office Action dated Apr. 29, 2019 for U.S. Appl. No. 15/298,149, 10 pages.
Non-Final Office Action dated May 24, 2019 for related U.S. Appl. No. 15/251,244.
Notice of Allowance dated Jun. 5, 2019 for related U.S. Appl. No. 15/283,004, 5 pages.
Non-Final Office Action dated Jun. 6, 2019 for related U.S. Appl. No. 15/181,094.

\* cited by examiner

STORAGE INFRASTRUCTURE SCENARIO PLANNING

FIELD

This disclosure relates to distributed data storage system management, and more particularly to techniques for distributed storage infrastructure scenario planning.

BACKGROUND

As the proliferation of distributed storage systems continues to increase, so does the complexity of managing the infrastructure components comprising the systems. Specifically, an IT administrator is often tasked with not only managing the infrastructure currently deployed at managed sites, but also an IT administrator is often tasked with scaling the infrastructure to satisfy the forthcoming demand for compute and/or storage capacity. For example, the administrator might be responsible for cluster management (e.g., deployment, maintenance, scaling, etc.), virtual machine (VM) management (e.g., creation, placement, protection, migration, etc.), storage management (e.g., allocation, policy compliance, location, etc.), and/or management of other aspects of the infrastructure. In some cases, the administrator can also be expected to consider multiple objectives and/or constraints when maintaining and/or planning the distributed storage system. For example, the administrator might be asked to apply a recovery point objective (RPO), and/or an infrastructure spend budget constraint, and/or other parameters, while also determining the interdependent mix of multiple attributes of the distributed storage system that ensure capacity needs are met.

Unfortunately, legacy techniques for managing distributed storage systems exhibit severe limitations, at least in their ability to determine a distributed storage infrastructure plan that considers multiple objectives and/or constraints. As one example of such legacy system limitations, legacy distributed storage system management approaches often exhibit poor accuracy in predicting capacity requirements used by the administrator for planning. System management tools might not accurately capture certain observable periodicities and/or observable seasonalities in the forecasted demand—potentially resulting in overspending or underspending on infrastructure. In some cases, the legacy approaches fail to assess planning tasks at all, and/or fail to assess or present planning scenarios that consider planning parameters (e.g., constraints, objectives, etc.) that might be provided by the IT administrator and/or derived from the system observations (e.g., CPU performance, network bandwidth, etc.). For example, the administrator might want to test several "what if" planning scenarios by adjusting various parameters to determine a set of plans that predictably offer the best outcomes. Legacy approaches further fail to provide meaningful recommendations (e.g., schedule changes, purchase plans, remediations, etc.) to the administrator.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for distributed storage infrastructure scenario planning, which techniques advance the relevant technologies to address technological issues with legacy approaches. More specifically, the present disclosure provides a detailed description of techniques used in systems, methods, and in computer program products for distributed storage infrastructure scenario planning. Certain embodiments are directed to technological solutions for providing a user interface for simulating various planning scenarios, which embodiments advance the relevant technical fields as well as advancing peripheral technical fields.

The disclosed embodiments modify and improve over legacy approaches. In particular, the herein-disclosed techniques provide technical solutions that address the technical problems attendant to assessing quantitative objectives pertaining to a distributed storage infrastructure plan in the presence of multiple interrelated constraints. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
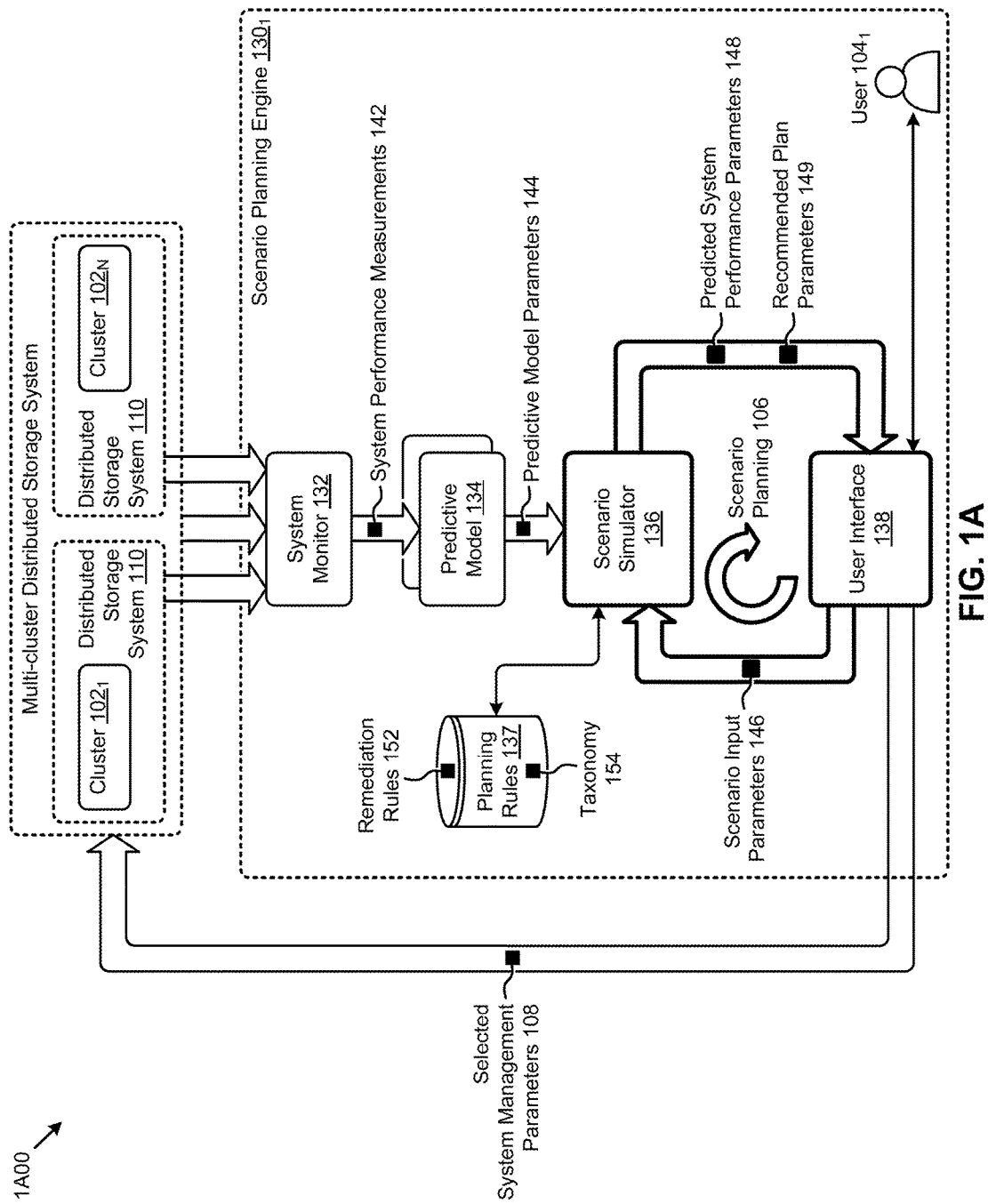
FIG. 1A depicts techniques used in distributed storage infrastructure scenario planning, according to an embodiment.

Some embodiments of the present disclosure address the problem of assessing quantitative objectives pertaining to a distributed storage infrastructure plan in the presence of multiple interrelated variables and/or constraints. Some embodiments are directed to approaches for providing a user interface for simulating various planning scenarios. The accompanying figures and discussions herein present example environments, systems, methods, and computer program products for distributed storage infrastructure scenario planning.

Overview

Disclosed herein are techniques for providing a user interface for simulating various planning scenarios to determine and/or suggest aspects of a predictably-improved distributed storage infrastructure plan. In certain embodiments, the planning scenarios can be generated based on a set of predicted system characteristics produced by a predictive model. In other embodiments, certain objective parameters and/or constraint parameters can further be used to generate and/or measure the planning scenarios. In one or more embodiments, various recommended plans and/or remediation plans can be generated. In some embodiments, the remediation plans can be based on a set of remediation rules. In yet further embodiments, a user can interact with the user interface to select any of the foregoing parameters, invoke any of the foregoing operations, analyze the plans, select any of the plans, and/or perform other operations pertaining to evaluation and/or remediation of various hypothetical planning scenarios.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A depicts techniques 1A00 used in distributed storage infrastructure scenario planning. As an option, one or more variations of techniques 1A00 or any aspect thereof may be implemented in the context of the architecture and functionality of the embodiments described herein. The techniques 1A00 or any aspect thereof may be implemented in any environment.

The embodiment shown in FIG. 1A comprises two representative computing and/or storage clusters (e.g., cluster $102_1$, ..., cluster $102_N$) having an associated distributed storage fabric managed by a distributed storage system 110. For example, the clusters might comprise multiple nodes, which in turn host multiple virtual machines (VMs) that exhibit characteristics or behaviors pertaining to CPU loading, storage I/O (input/output or IO) activity, and/or other characteristics or behaviors that are often be highly dynamic (e.g., exhibiting a high rate of variance over time). One or more administrators (e.g., user $104_1$) might be responsible for managing such clusters (e.g., deployment, maintenance, scaling, etc.), the VMs within the clusters (e.g., creation, placement, protection, migration, etc.), and/or the associated distributed storage fabric (e.g., allocation, policy compliance, location, etc.). The administrator might further be expected to comply with certain objectives and/or constraints (e.g., data policies, budgets, technology limits, etc.) when maintaining and/or planning the infrastructure and/or configuration associated with the clusters.

As shown, the herein-disclosed techniques can address the foregoing challenges attendant to assessing quantitative objectives pertaining to distributed storage infrastructure planning in the presence of multiple interrelated constraints using a scenario planning engine $130_1$. As shown, the scenario planning engine $130_1$ comprises a system monitor 132 to collect various instances of system performance measurements 142 over a network 114 from the distributed storage system 110.

Scenario Planning Using Predictive Models

The scenario planning engine uses system performance measurements 142 so as to generate one or more predictive models (e.g., predictive model 134). An ensemble of predictive models might be used to account for limitations of any one model and/or its respective algorithms. In some cases, a given model might have captured desired attributes, yet might be limited in its use for predicting certain seasonalities. With an ensemble of predictive models, a voting algorithm or selection tournament can be executed to identify the best model for a given environment, historical time range, and/or other model input (e.g., constraints). The predictive model 134 shown can represent the selected model from the ensemble of predictive models.

A set of predictive model parameters 144 (e.g., input variables, output variables, equations, equation coefficients, mapping relationships, limits, constraints, etc.) describing the predictive model 134 can be used by a scenario simulator 136 to generate a set of predicted system performance parameters 148 characterizing a predicted system performance of the distributed storage system 110. Certain instances of scenario input parameters 146 can further be applied (e.g., as input variables, limits, constraints, etc.) to the predictive model parameters 144 by the scenario simulator 136 to generate the predicted system performance parameters 148. For example, a certain time horizon and set of clusters can be identified in an instance of the scenario input parameters 146 to simulate a planning scenario with the identified characteristics. The scenario input parameters can include a range of constraints using a range of metrics. Strictly as examples, the scenario input parameters can comprise any or all of, a target runway time period, a recovery period objective time limit, a maximum data loss limit, a maximum storage utilization metric, a maximum CPU utilization limit, a minimum CPU headroom limit, etc.

In some embodiments, the user $104_1$ can select and/or specify at least some of the scenario input parameters 146 at a user interface 138 associated with the scenario planning engine $130_1$.

The user $104_1$ can also view various representations (e.g., charts, graphs, tables, etc.) of the predicted system performance parameters 148 for various purposes. For example, the user $104_1$ might interact with the user interface 138 to define and simulate various planning scenarios to facilitate selection of a planning scenario that best fits one or more objectives (e.g., scenario planning 106). A set of selected system management parameters 108 characterizing the one or more planning scenarios selected by the user $104_1$ and/or selected automatically by the scenario planning engine $130_1$ can be delivered to the distributed storage system 110 to influence the behavior of the distributed storage system 110.

In certain embodiments, a set of recommended plan parameters 149 can be determined by the scenario planning engine $130_1$. Specifically, an instance of the recommended plan parameters 149 might represent the planning scenario that is nearest to an objective efficient curve produced by various objectives specified by the user $104_1$. In other cases, the recommended plan parameters 149 can represent one or more remediation plans determined by the scenario planning engine $130_1$ to remediate certain constraint breaches associated with an earlier simulated planning scenario. For example, a given planning scenario might have a corresponding set of predicted system performance parameters 148 that indicate that storage capacity might be exceeded in 20 days. In this example, a set of recommended plan parameters 149 generated in response to the given planning scenario might indicate that additional storage facilities be allocated to the cluster, the frequency of snapshots be reduced, and/or that other remediation techniques be implemented.

In some cases, the recommended plan parameters 149 and/or other parameters used by the scenario planning engine $130_1$ can be determined based in part on a set of planning rules 137. For example, such rules might comprise a set of remediation rules 152 that can serve as a lookup table for mapping planning scenario issues to remediation plans. The planning rules 137 might further comprise a taxonomy 154 to facilitate selection of scenario input parameters 146, codification of the remediation rules 152, interpretation of objective intent, and/or other functions.

In this and other embodiments, the scenario planning engine is implemented as a set of computing processes that cooperate to relate system performance measurements and predictions made therefrom to "what-if" inquiries made by a user. The "what-if" inquiries (e.g., using scenario input parameters) can be codified as queries that can be executed within the scenario planner so as to produce answers to the query as well as planning recommendations. A user can cause a scenario planner such as is shown in FIG. 1A to iterate any number of times over multiple user-provided "what-if" inquiries. The aforementioned system performance measurements can be codified into computer-readable data (e.g., time series data sets). Examples of data sets used by the scenario planning engine $130_1$ to execute some of the foregoing operations (e.g., scenario planning 106, predicting system performance, simulating remediation plans, etc.) are shown and described as pertaining to FIG. 1B.

Figure 1B:
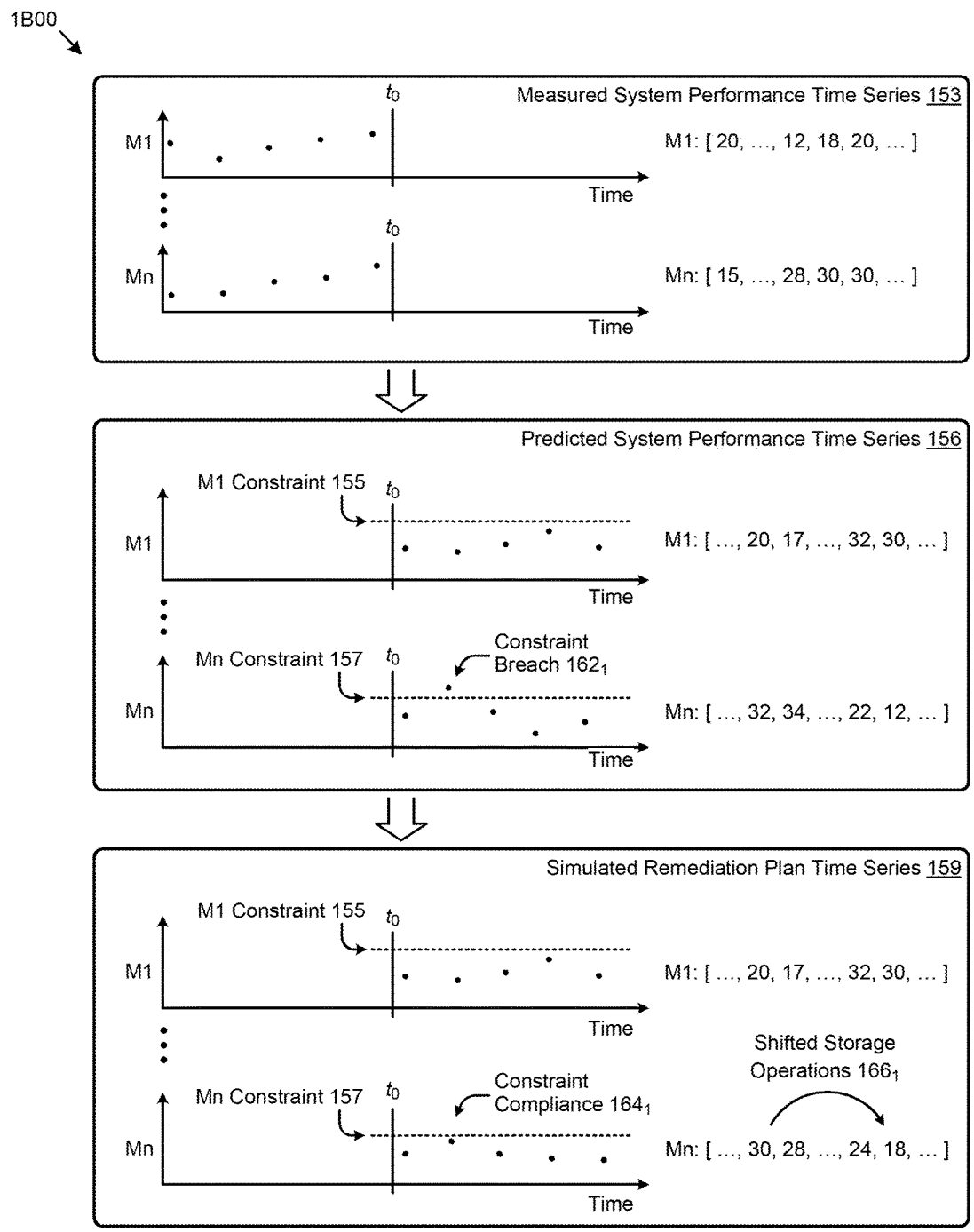
FIG. 1B presents diagrams showing time series data sets used in systems for distributed storage infrastructure scenario planning, according to an embodiment.

FIG. 1B presents diagrams showing variations of time series data sets 1B00 used in systems for distributed storage infrastructure scenario planning. As an option, one or more variations of time series data sets 1B00 or any aspect thereof may be implemented in the context of the architecture and functionality of the embodiments described herein. The time series data sets 1B00 or any aspect thereof may be implemented in any environment.

FIG. 1B depicts, in both graph form and array form, two representative distributed storage system performance metrics (e.g., M1, Mn) in a measured system performance time series 153. Specifically, performance metric M1 and performance metric Mn are shown graphically as a series of discrete values for a given unit of time (e.g., per day) from a certain historical moment in time to a then current time of $t_0$ (e.g., the moment in time the shown data was collected). Performance metric M1 and performance metric Mn are further shown in the measured system performance time series 153 as a one-dimensional array of discrete values corresponding to an explicit moment in time. For example, the start time and sample rate of the one-dimensional array can be recorded at the time of measurement such that the corresponding graphs shown can be readily constructed.

According to the herein disclosed techniques, one or more predictive models can be used to generate a predicted system performance time series 156 for M1 and Mn from the measured system performance time series 153 and/or other information. As shown, the predicted system performance time series 156 represents predictions of M1 and Mn for moments of time later than $t_0$. The predicted metrics can further be compared to various constraints, such as an M1 constraint 155 and an Mn constraint 157. Such a comparison reveals that while the predicted M1 values remain below the M1 constraint 155, the predicted values of performance metric Mn exceed the Mn constraint 157 in a constraint breach $162_1$.

In some cases, the Mn constraint 157 might correspond merely to an alert level (e.g., CPU usage at 75% of capacity) such that the constraint breach $162_1$ might not invoke immediate action. In other cases, the Mn constraint 157 might correspond to a critical constraint (e.g., 100% of storage capacity), such that the constraint breach $162_1$ can be identified for remediation. The herein disclosed techniques can facilitate such remediation (e.g., of critical constraints) by generating recommended plan parameters to address issues pertaining to given constraints, objectives, and/or other scenario planning criteria. Specifically, for example, the recommended plan parameters might be used (e.g., selected by an administrator) to generate a simulated remediation plan time series 159. The graphical representation of the simulated remediation plan time series 159 indicates that the predicted Mn values are expected to exhibit a constraint compliance $164_1$. In this case, for example, the recommended plan parameters produced by the herein disclosed techniques call for a shift of certain storage operations to a later moment in time (e.g., shifted storage operations $166_1$), resulting in the constraint compliance $164_1$. The techniques disclosed herein eliminated the expense of adding more storage capacity to address the constraint breach $162_1$ that might have been incurred using legacy approaches to infrastructure planning.

Figure 1C:
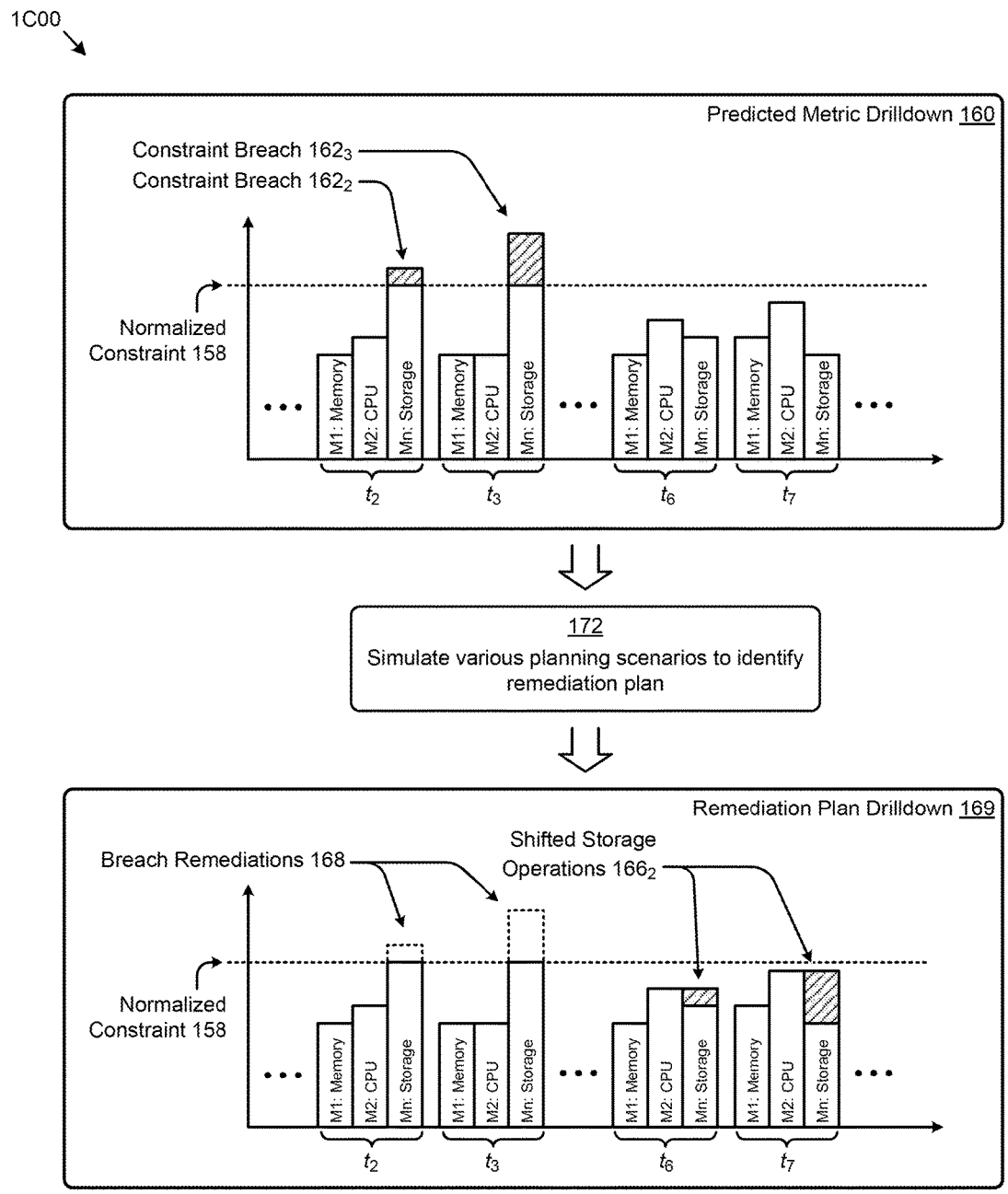
FIG. 1C illustrates a remediation technique facilitated by systems for distributed storage infrastructure scenario planning, according to an embodiment.

Further details pertaining to the remediation technique introduced in FIG. 1B are disclosed in FIG. 1C.

FIG. 1C illustrates a remediation technique 1C00 facilitated by systems for distributed storage infrastructure scenario planning. As an option, one or more variations of remediation technique 1C00 or any aspect thereof may be implemented in the context of the architecture and functionality of the embodiments described herein. The remediation technique 1C00 or any aspect thereof may be implemented in any environment.

The embodiment shown in FIG. 1C represents a portion of the time series data shown in FIG. 1B. Specifically, FIG. 1C comprises a predicted metric drilldown 160 that shows three representative metrics (e.g., M1: Memory, M2: CPU, . . . , Mn: Storage . . . ) for each timestamp (e.g., . . . , $t_2$, $t_3$, . . . , $t_6$, $t_7$, . . . ) in the time series. For example, the metric M1 might correspond to local memory usage, the metric M2 might correspond to a CPU loading metric, and the metric Mn might correspond to a remote (e.g., networked) storage usage metric. Any constraints and/or combination of constraints associated with the foregoing metrics can be normalized (e.g., as a percentage) to form a normalized constraint 158. Among other purposes, the normalized constraint 158 can serve to visually identify any or all metrics that can be or are near being characterized as limiting factors. For example, as shown, metric Mn surpasses the normalized constraint 158 in two instances (see constraint breach $162_2$ and constraint breach $162_3$); one constraint breach at time $t_2$ and one constraint breach at time $t_3$.

According to the herein disclosed techniques, various planning scenarios can be simulated to determine a remediation plan for the constraint breaches. One such remediation technique is depicted in the predicted metric drill down 160 (see operation 172). In some cases, the techniques described herein can generate a set of remediation recommendations to facilitate identification and selection of generated remediation plans. A remediation plan drilldown 169 depicts certain attributes of an example remediation plan that addresses the two instances of the constraint breaches shown in the predicted metric drilldown 160. Specifically, the remediation plan represented in the remediation plan drilldown 169 identifies opportunities to shift certain operations (e.g., maintenance operations) that require a respective storage capacity. The shown time shift moves one maintenance operation from time $t_2$ to time $t_6$ and another maintenance operation from time $t_3$ to time $t_7$, thus moving the maintenance operations to times when storage usage is predicted to be lower. As shown, the shifted storage operations $166_2$ result in breach remediations 168. In some cases, the herein disclosed techniques can enable a drill down to another level of detail showing, for example, specific VMs, applications, tasks, storage devices, and/or other infrastructure attributes that can impact performance and/or remediation.

As earlier described, the herein disclosed techniques can address the problems attendant to assessing quantitative objectives pertaining to a distributed storage infrastructure plan in the presence of multiple interrelated constraints. One embodiment of an environment comprising such a distributed storage infrastructure is shown and described as pertaining to FIG. 2.

Figure 2:
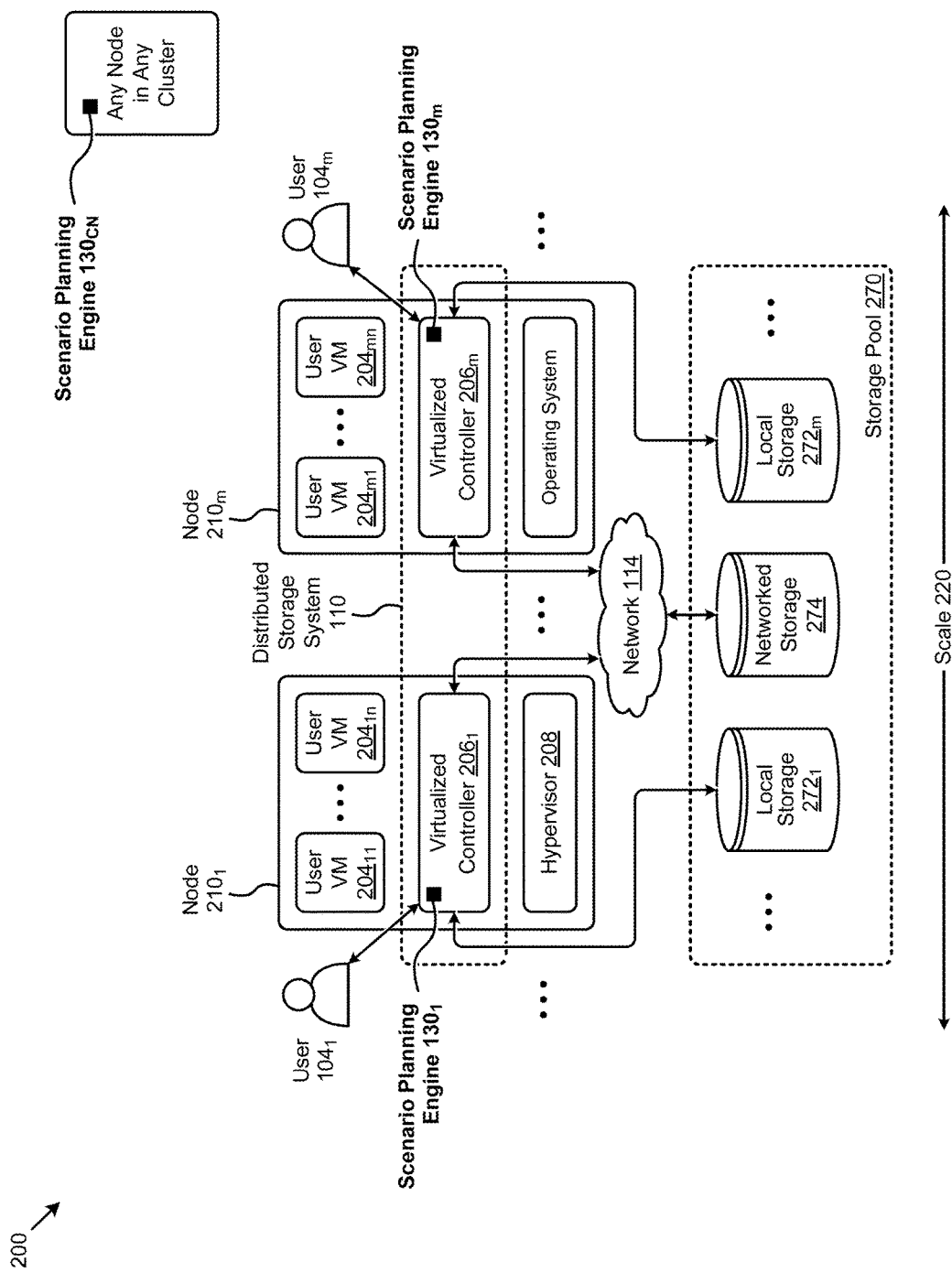
FIG. 2 presents an environment in which embodiments of the present disclosure can operate.

FIG. 2 presents an environment 200 in which embodiments of the present disclosure can operate. As an option, one or more variations of environment 200 or any aspect thereof may be implemented in the context of the architecture and functionality of the embodiments described herein.

The environment 200 shows various components associated with the distributed storage system 110 that can be managed (e.g., planned) by one or more administrators according to the herein disclosed techniques. Specifically, the environment 200 can comprise multiple nodes (e.g., node $210_1$, . . . , node $210_m$) that have multiple tiers of storage in a storage pool 270. For example, each node can be associated with one server, multiple servers, or portions of a server. The multiple tiers of storage can include storage that is accessible through the network 114, such as a networked storage 274 (e.g., a storage area network (SAN)). The storage pool 270 can also comprise one or more instances of local storage (e.g., local storage $272_1$, . . . , local storage $272_m$) that is within or directly attached to a server and/or appliance associated with the nodes. Such local storage can include solid state drives (SSDs), hard disk drives (HDDs), and/or other storage devices.

Each node can run virtualization software (e.g., VMware ESXi, Microsoft Hyper-V, RedHat KVM, Nutanix AHV, etc.) that includes a hypervisor. For example, a hypervisor 208 might correspond to VMware ESXi software, or a hypervisor 208 might correspond to Nutanix AHV software. Such hypervisors can manage the interactions between the underlying hardware and one or more user VMs (e.g., user VM $204_{11}$, . . . , user VM $204_{1n}$, user VM $204_{m1}$, . . . , user VM $204_{mn}$) that run client software.

An instance of a virtualized controller can be used to manage storage and I/O activities. Multiple instances of a virtualized controller (e.g., virtualized controller $206_1$, . . . , virtualized controller $206_m$) coordinate within a cluster to form the distributed storage system 110 which can, among other operations, manage the storage pool 270. The virtualized controllers might run as virtual machines above the hypervisors on the various servers. When the virtualized controllers run above the hypervisors, varying virtual machine architectures and/or hypervisors can operate with the distributed storage system 110. In some cases a virtualized controller runs as a container on top of an operating system (as shown), where the virtualized controller does not rely on the existence of, or cooperation with a hypervisor. The architecture of FIG. 2 facilitates efficient scaling of the distributed computing and/or storage platform (see scale 220).

In one or more embodiments, one or more instances of the scenario planning engine disclosed herein can be implemented in the distributed storage system 110. Specifically, an instance of the scenario planning engine $130_1$ can be implemented in the virtualized controller $206_1$, and another instance of the scenario planning engine $130_m$ can be implemented in the virtualized controller $206_m$. In some embodiments a scenario planning engine (e.g., scenario planning engine $130_{CN}$) can be implemented in any node in any cluster from among 1-to-N clusters.

In various embodiments including the embodiment depicted in FIG. 2, the scenario planning engine is implemented within or in cooperation with a virtualized controller. As such, the scenario planning engine, possibly using a system monitor 132, can listen to streams of storage I/O that arise from any one or more of the shown user virtual machines hosted on a particular node. Such storage I/O includes any storage commands and/or data. Actions corresponding to storage commands are performed over storage devices in the storage pool 270. Data corresponding to performance of storage commands sent to or retrieved from storage devices (e.g., local storage or networked storage) in the storage pool.

Inasmuch as streams of storage I/O that arise from any one or more of the shown user virtual machines hosted on a particular node can be monitored and processed by a scenario planner, it is possible that scenario planning activities including remediation can be driven by data gathered from a single node, or by data gathered over multiple nodes. Node data arising from and/or gathered by any node can be stored in the storage pool (e.g., in metadata form), which node data can derive from operation of a single node, or from operations or communications between multiple nodes of the distributed storage system.

In some cases, streams of storage I/O correspond to system performance measurements that are derived from a series of storage I/O commands issued by a user virtual machine to a virtualized controller that accesses a storage pool. Remediation can depend from such observations. For example, unexpectedly high latency observed when a user virtual machine is performing storage I/O to a hard disk drive in the storage pool might suggest over-utilization of the hard disk drive, which in turn might suggest remediation in the form of additional hard disk drive capacity and/or swap-in of a faster disk drive.

Further details regarding general approaches to managing a storage pool using a virtual machine that operates as a storage controller dedicated to a particular node are described in U.S. Pat. No. 8,601,473 titled, "ARCHITECTURE FOR MANAGING I/O AND STORAGE FOR A VIRTUALIZATION ENVIRONMENT" filed on Aug. 10, 2011, which is hereby incorporated by reference in its entirety.

Centralized Administration

One or more administrators (e.g., user $104_1$ and user $104_m$, respectively) can access any instance of a scenario planning engine to manage a single cluster, multiple clusters, and/or other portions of the distributed storage system infrastructure. In certain embodiments, the user interface to the scenario planning engine can be based on certain web technology (e.g., HTML5, REST API, CLI, PowerShell CMDlets, etc.) to facilitate efficient access (e.g., in a browser).

Further details regarding computing environment management using user interfaces are described in U.S. Utility patent application Ser. No. 15/006,435 titled "ARCHITECTURE FOR IMPLEMENTING USER INTERFACES FOR CENTRALIZED MANAGEMENT OF A COMPUTING ENVIRONMENT" filed on Jan. 26, 2016, which is hereby incorporated by reference in its entirety.

Such a user interface can be used for various interactions between the administrator and the scenario planning engine. According to some embodiments, a portion of such of interactions can pertain to defining certain remediation rules for use by the herein disclosed techniques. Further details regarding such remediation rules are disclosed as related to FIG. 3.

Figure 3:
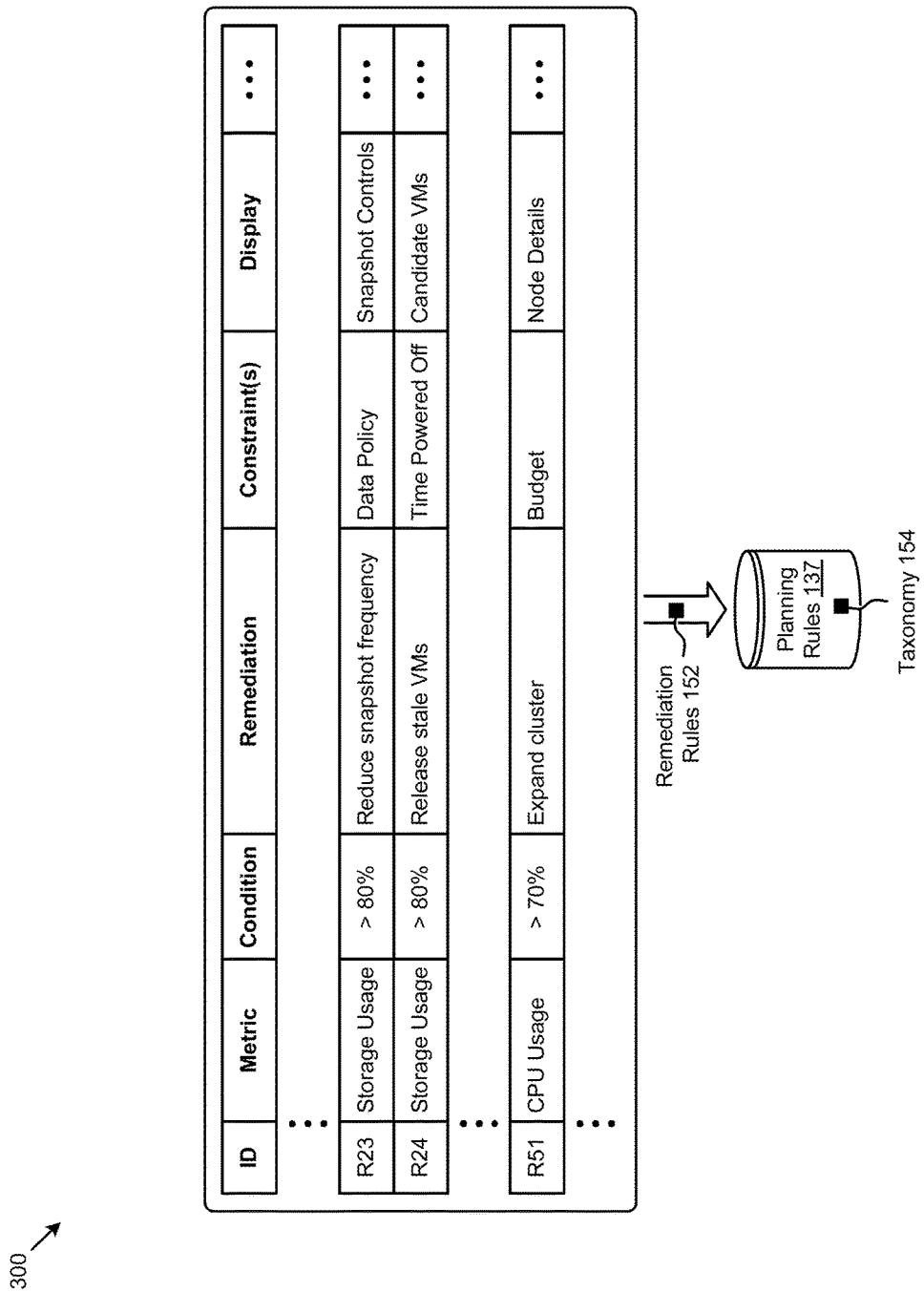
FIG. 3 presents a data structure for codifying remediation rules that are used in systems for distributed storage infrastructure scenario planning, according to an embodiment.

FIG. 3 presents a data structure 300 for codifying remediation rules that are used in systems for distributed storage infrastructure scenario planning. As an option, one or more variations of data structure 300 or any aspect thereof may be implemented in the context of the architecture and functionality of the embodiments described herein. The data structure 300 or any aspect thereof may be implemented in any environment.

The data structure 300 depicts a tabular structure (e.g., relational database table) having rows associated with a respective remediation rule and columns associated with certain remediation rule attributes. Specifically, in some embodiments, the remediation rule attributes can characterize an identifier (e.g., ID), a subject metric (e.g., Metric), a condition or conditional rule (e.g., Condition), a remediation description (e.g., Remediation), one or more constraints pertaining to the metric and/or remediation (e.g., Constraint(s)), a display instruction for the user interface (e.g., Display), and/or other characteristics. For example, remediation rule R24 might be triggered when storage usage exceeds 80%. In that case, a remediation to "Release Stale VMs" might be recommended. A set of candidate VMs to be released can be displayed (e.g., to an administrator at a user interface) based on the constraint of a time the VM has been idle or powered off. For example, a list of VMs having been powered off for more than 60 days might be displayed for selection by the administrator.

In certain embodiments, the set of remediation rules 152 can be stored in the planning rules 137 for use by the herein disclosed techniques. In some cases, the remediation rules 152 and corresponding attributes can be selected by the administrator using a user interface. In other cases, certain rules might be derived from earlier established policies. When building a remediation rule, the attribute selection can be based on the taxonomy 154 to facilitate a certain consistency and/or efficacy related to various operations (e.g., applying a rule to a predictive model). An embodiment of a technique for implementing various such operations is discussed as pertaining to FIG. 4.

Figure 4:
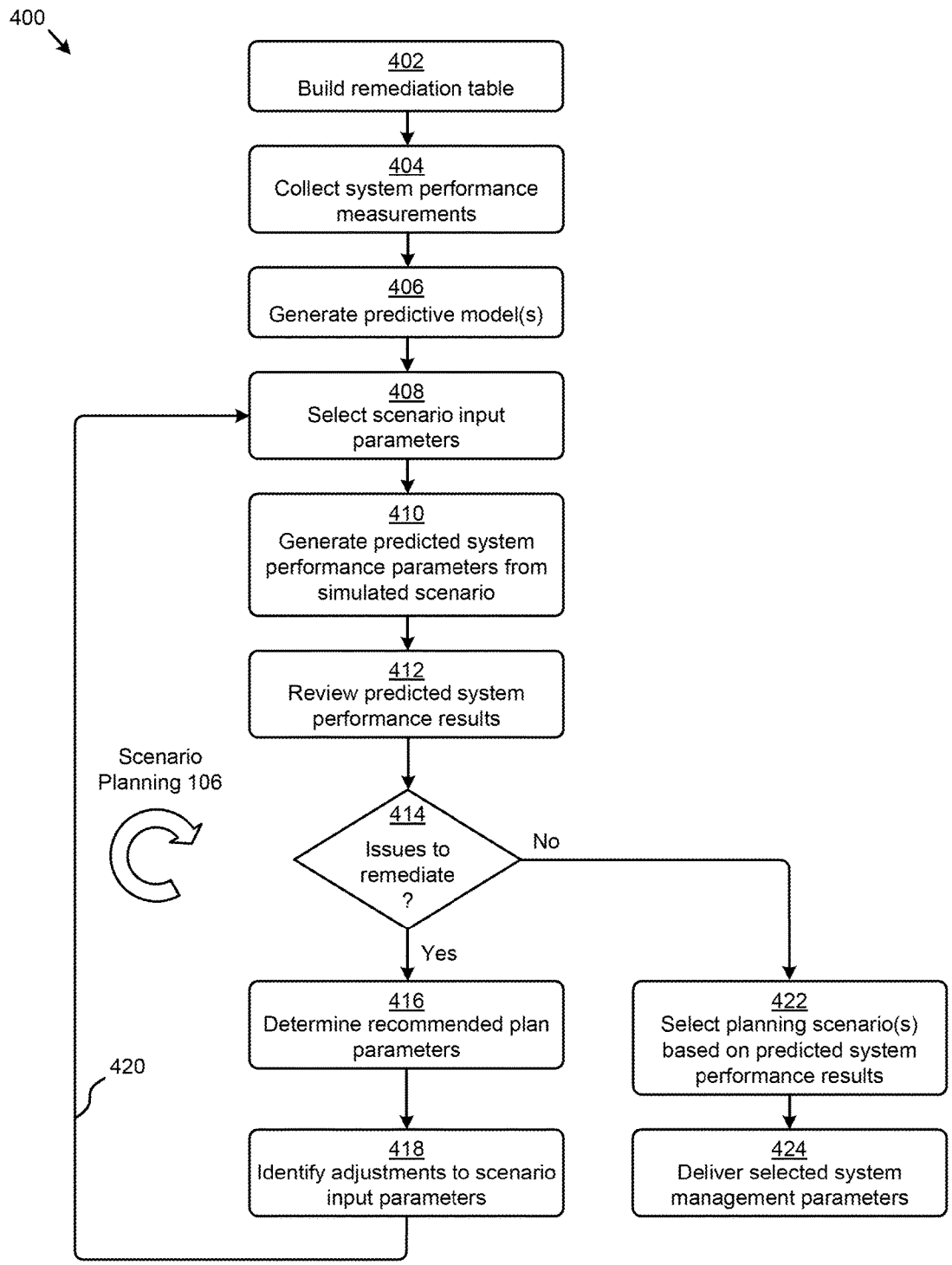
FIG. 4 presents a scenario planning technique as implemented in systems for distributed storage infrastructure scenario planning, according to some embodiments.

FIG. 4 presents a scenario planning technique 400 as implemented in systems for distributed storage infrastructure scenario planning. As an option, one or more variations of scenario planning technique 400 or any aspect thereof may be implemented in the context of the architecture and functionality of the embodiments described herein. The scenario planning technique 400 or any aspect thereof may be implemented in any environment.

The scenario planning technique 400 presents one embodiment of certain steps and/or operations for facilitating scenario planning (see scenario planning 106) according to the herein disclosed techniques. In one or more embodiments, the steps and underlying operations comprising the scenario planning technique 400 can be executed by an instance of the scenario planning engine $130_1$ described as pertaining to FIG. 1A. As shown, the scenario planning technique 400 can commence with building a remediation table (see operation 402). For example, a remediation table (see FIG. 3) can be specified by an administrator interfacing with the scenario planning engine $130_1$ and/or automatically from various information (e.g., enterprise data retention policy). The scenario planning technique 400 can further collect system performance measurements associated with the subject distributed storage system being managed (see operation 404). For example, a set of measurement data pertaining to a certain historical time period and/or certain set of clusters might be collected. Using the collected measurement data and/or other information, one or more predictive models can be generated (see operation 406). In some cases, an ensemble of predictive models can be used to improve the accuracy of predicted system behavior.

As shown, various scenario input parameters can be selected by the scenario planning technique 400 (see operation 408). In some cases, for example, scenario input parameters might be specified by the administrator to run a specific planning scenario. In other cases, certain scenario input parameters can be generated by the scenario planning engine $130_1$. For example, a range of values for a certain variable (e.g., number of nodes) might be generated to facilitate a sensitivity analysis (e.g., to determine a recommended plan). The selected scenario input parameters can be applied (e.g., as model inputs) to the predictive model to generate a set of predicted system performance parameters characterizing a simulated scenario (see operation 410). The predicted system performance represented by the predicted system performance parameters can then be reviewed (see operation 412). For example, the administrator might review graphs, charts, and/or other displayed data characterizing the predicted system performance.

If the predicted results indicate there are issues to remediate (see "Yes" path for decision 414), certain recommended plan parameters can be determined (see operation 416). For example, the scenario planning engine $130_1$ might detect that one or more metrics associated with the simulated planning scenarios exceeded one or more constraints. In such a case, as an example, the remediation table can be used to determine one or more remediation plans to display to the administrator. The administrator might then identify certain adjustments to be made to the scenario input parameters (see operation 418) to produce an updated set of predicted performance parameters (see loop 420). In some cases, the updated scenario input parameters might reflect a remediation action taken by the administrator and/or the scenario planning engine $130_1$. For example, a recommended remediation to expand a cluster might have been executed such that the scenario input parameters can reflect such an expansion when the predicted system performance is re-simulated.

If the predicted results indicate there are no issues to remediate (see "No" path for decision 414), one or more planning scenarios can be selected based on the predicted performance results (see operation 422). For example, the administrator might visually compare the performance results of multiple planning scenario to select the one that most likely addresses the specified objectives. In some cases, the scenario planning engine $130_1$ might facilitate the selection by ranking the planning scenarios according to a multi-objective analysis. When the planning scenarios have been selected, certain selected system management parameters representing the planning scenarios can be delivered to the distributed storage system (see operation 424). For example, the parameters describing a planning scenario might need to be converted to the selected system management parameters for interpretation by the distributed storage system. More specifically, as an example, a snapshot plan pertaining to a selected planning scenario may need to be characterized by certain configuration parameters that can be interpreted by a snapshot scheduler agent in the distributed storage system.

In some embodiments, several of the foregoing operations might rely on a man-machine interface (e.g., user interface) between an administrator (e.g., user) and the scenario planning engine $130_1$. One embodiment of such a user interface is shown and described as pertaining to FIG. 5A and FIG. 5B.

Figure 5A:
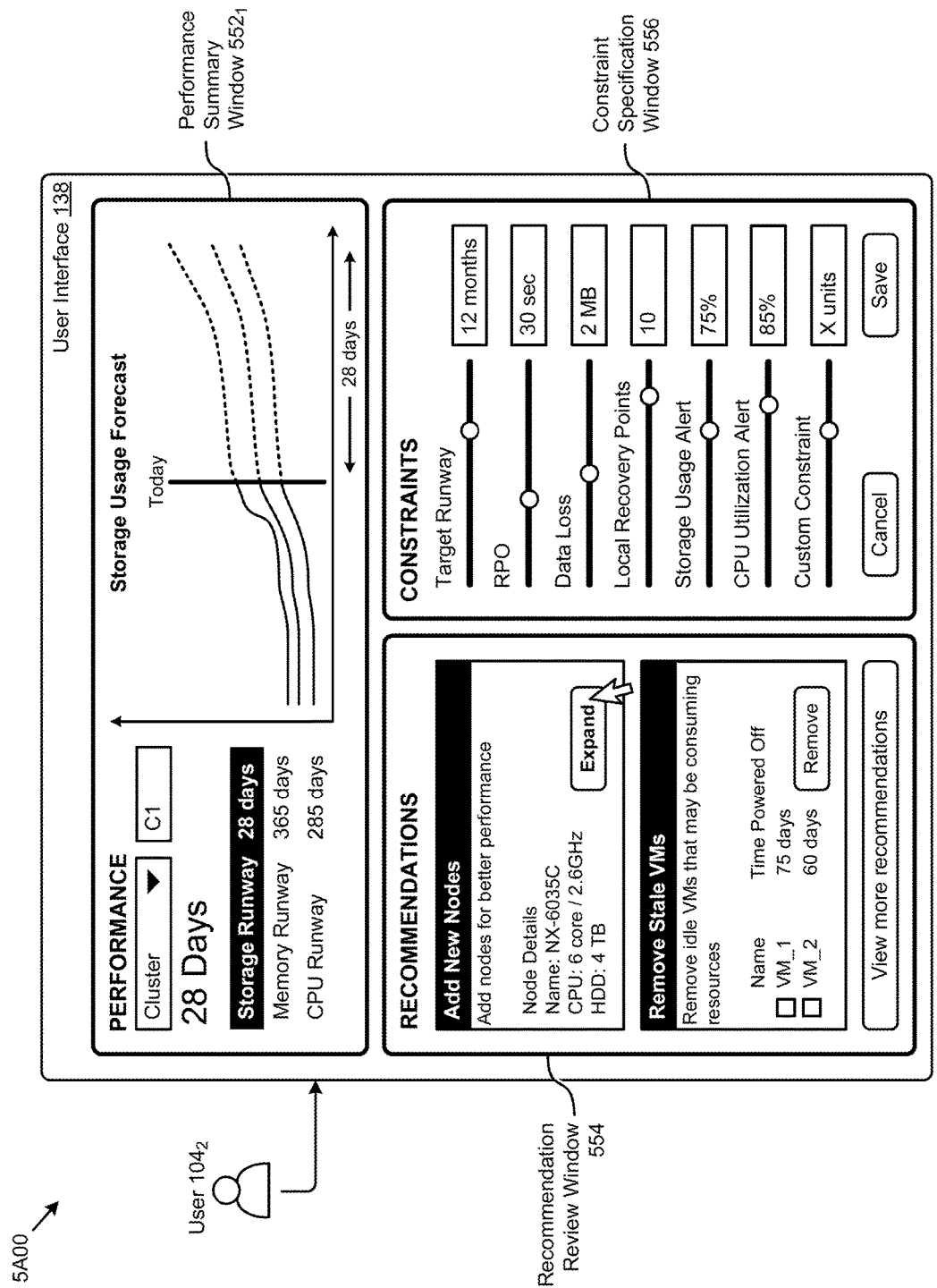
FIG. 5A presents a scenario planning view of a user interface implemented by systems for distributed storage infrastructure scenario planning, according to an embodiment.

FIG. 5A presents a scenario planning view 5A00 of a user interface implemented by systems for distributed storage infrastructure scenario planning. As an option, one or more variations of scenario planning view 5A00 or any aspect thereof may be implemented in the context of the architecture and functionality of the embodiments described herein. The scenario planning view 5A00 or any aspect thereof may be implemented in any environment.

Specifically, the scenario planning view 5A00 depicts an example view of the user interface 138 associated with the scenario planning engine $130_1$ shown and described as pertaining to FIG. 1A and throughout this specification. The scenario planning view 5A00 can be used by an administrator (e.g., user $104_2$) to facilitate various operations enabled by the herein disclosed techniques for distributed storage infrastructure scenario planning. Specifically, the scenario planning view 5A00 comprises a performance summary window $552_1$, a recommendation review window 554, and a constraint specification window 556. Other windows are possible.

In the example illustrated in the scenario planning view 5A00, the performance characteristics (e.g., historical and predicted) for observed cluster C1 is shown in the performance summary window $552_1$. For this particular planning scenario, the storage runway is predicted to be 28 days, which is substantially less than the target runway of 12 months or 365 days. In response to this shortcoming, a set of remediation recommendations are displayed in the recommendation review window 554. For example, the storage runway constraint breach may correspond to the shown remediation recommendations in a remediation table. Specifically, recommendations to add new nodes and/or release stale VMs are highlighted. Other recommendations may be available, but may be ranked lower in terms of remediation efficacy. As shown, details (e.g., new node specifications, candidate idle VMs, etc.) pertaining to each recommendation can be presented. One or more of the recommended remediation actions may be selected by the user $104_2$. Further, one or more of the constraints in the constraint specification window 556 can be adjusted to facilitate remediation of the storage runway issue. For example, the RPO constraint and/or the data loss constraint might be increased to assist in remediation of the issue. In some embodiments, the limits of the sliders in the constraint specification window 556 might be determined by various information. For example, an enterprise-wide data policy might determine a maximum for the RPO constraint and/or the data loss constraint.

As an example, the user $104_2$ has determined to add new nodes by clicking the "Expand" button. One example view that might result from this action is shown in FIG. 5B.

Figure 5B:
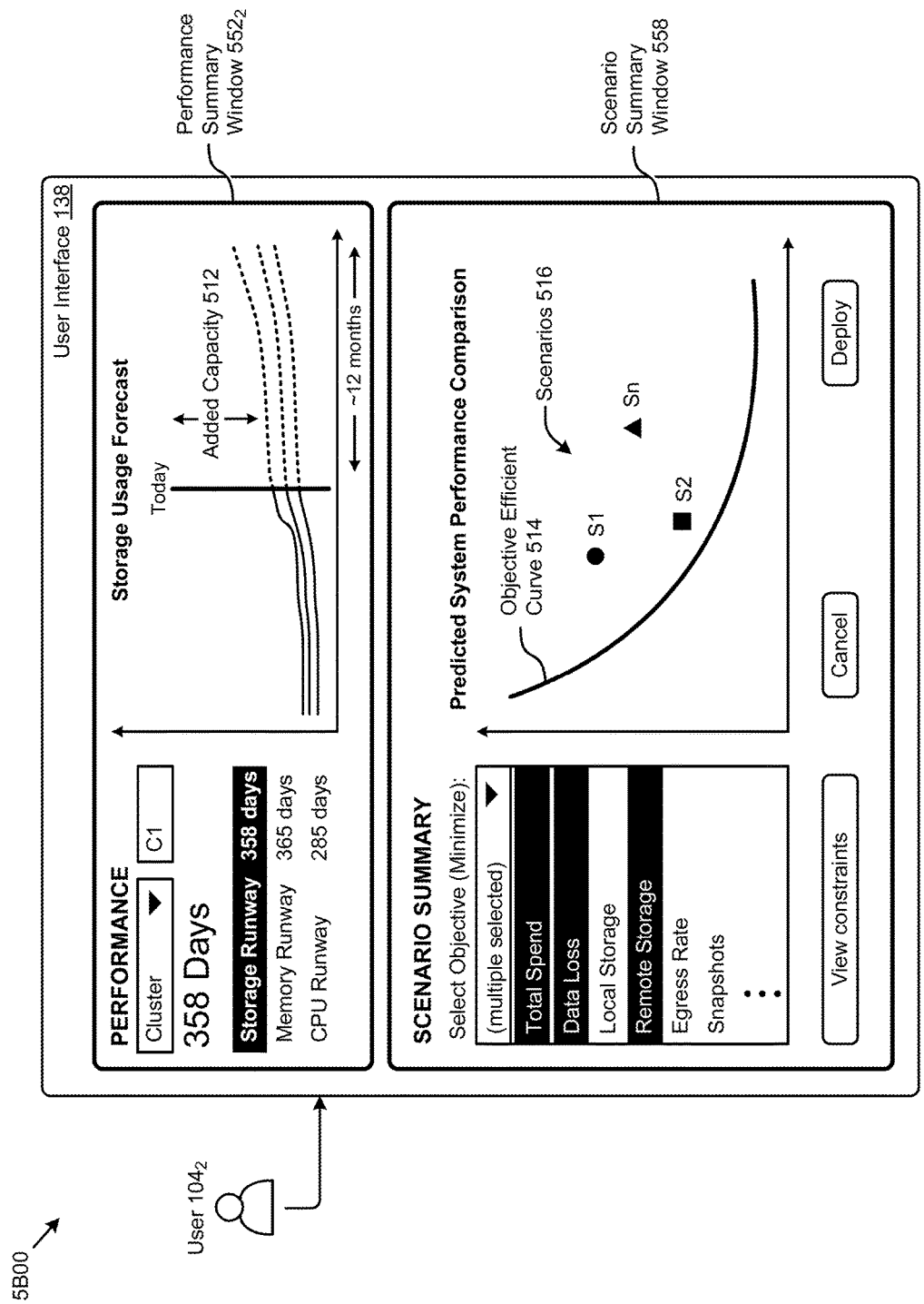
FIG. 5B presents a scenario performance view of a user interface implemented by systems for distributed storage infrastructure scenario planning, according to an embodiment.

FIG. 5B presents a scenario performance view 5B00 of a user interface implemented by systems for distributed storage infrastructure scenario planning. As an option, one or more variations of scenario performance view 5B00 or any aspect thereof may be implemented in the context of the architecture and functionality of the embodiments described herein. The scenario performance view 5B00 or any aspect thereof may be implemented in any environment.

As shown in the performance summary window $552_2$ of the user interface 138, expanding the cluster by adding new nodes (see the recommendation review window 554 in FIG. 5A) resulted in a certain amount of added capacity 512. Further, the predicted storage runway has increased to 358 days. At least as pertaining to the shown runway metrics, the predicted system performance is near the target performance (e.g., 12 months of runway).

Further details regarding general approaches to forecasting are described in U.S. Provisional Application Ser. No. 62/243,655 titled, "SEASONAL TIME SERIES ANALYSIS AND FORECASTING USING A DISTRIBUTED TOURNAMENT SELECTION PROCESS" filed on Oct. 19, 2015, which is hereby incorporated by reference in its entirety.

Further depicted in the scenario performance view 5B00 is a scenario summary window 558. In the embodiment and example shown, the scenario summary window 558 can present various collections of scenarios 516 (e.g., S1, S2, Sn) plotted on a two-dimensional objective space comprising an objective efficient curve 514. For example, the objective efficient curve 514 can represent the set of possible optima (e.g., Pareto optima) corresponding to the selected objectives (e.g., minimize total spend, data loss, and remote storage), and subject to various other constraints (e.g., see constraint specification window 556 in FIG. 5A). The administrator (e.g., user $104_2$) can use the shown predicted system performance for the respective scenarios as a visual aid in selecting the planning scenario that best fits the selected objectives subject to the selected constraints. For example, in most cases, the solution nearest to the objective efficient curve 514 (e.g., scenario S2) might be selected for deployment to the distributed storage system.

Additional Embodiments of the Disclosure

Additional Practical Application Examples

Figure 6A:
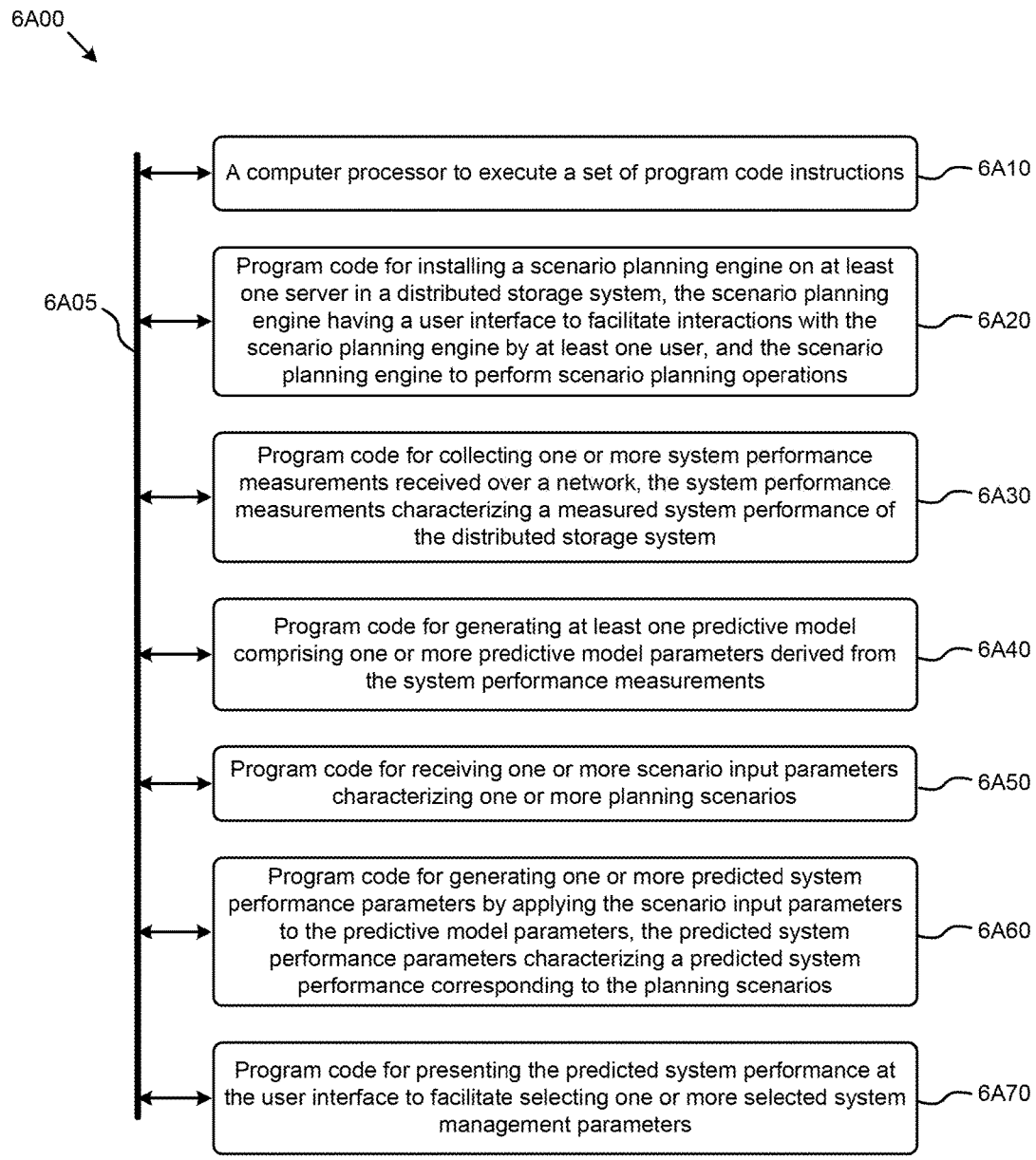
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising a computer processor to execute a set of program code instructions (see module 6A10) and modules for accessing memory to hold program code instructions to perform: invoking a scenario planning engine on at least one server in a distributed storage system, the scenario planning engine having a user interface to facilitate interactions with the scenario planning engine by at least one user, and the scenario planning engine to perform scenario planning operations comprising (see module 6A20); collecting one or more system performance measurements (e.g., received over a network), the system performance measurements characterizing a measured system performance of the distributed storage system (see module 6A30); generating at least one predictive model comprising one or more predictive model parameters derived from the system performance measurements (see module 6A40); receiving one or more scenario input parameters (e.g., "what-if" input parameters) characterizing one or more planning scenarios (see module 6A50); generating one or more predicted system performance parameters by applying the scenario input parameters to the predictive model parameters, the predicted system performance parameters characterizing a predicted system performance corresponding to the planning scenarios (see module 6A60); and presenting the predicted system performance at the user interface to facilitate selecting one or more selected system management parameters (see module 6A70).

Variations of the foregoing may include more or fewer of the foregoing modules and variations may perform more or fewer (or different) steps, and may use data elements in more or fewer (or different) operations.

Strictly as examples, variations can include:
  Variations where system performance measurements are derived from storage I/O commands issued by a user virtual machine.
  Variations where storage I/O commands arising from a particular node are processed by a node-specific virtualized controller that accesses a storage pool that is shared by multiple nodes.
  Variations that comprise acts of determining one or more recommended plan parameters based at least in part on predicted system performance parameters.
  Variations that comprise acts of adjusting at least one of the scenario input parameters based on recommended plan parameters.
  Variations where determining recommended plan parameters is based at least in part on one or more planning rules.
  Variations where the planning rules comprise remediation rules.
  Variations where the scenario input parameters or the selected system management parameters are selected by the user at the user interface of the scenario planning engine.
  Variations where the scenario input parameters correspond to a constraint or an objective.
  Variations where the scenario input parameters are based on a taxonomy.
  Variations where the measured system performance or the predicted system performance is described by a set of time series data.
  Variations where a change in a selected system management parameter value is predicted to cause an observable change in one or more behaviors of the distributed storage system.

Figure 6B:
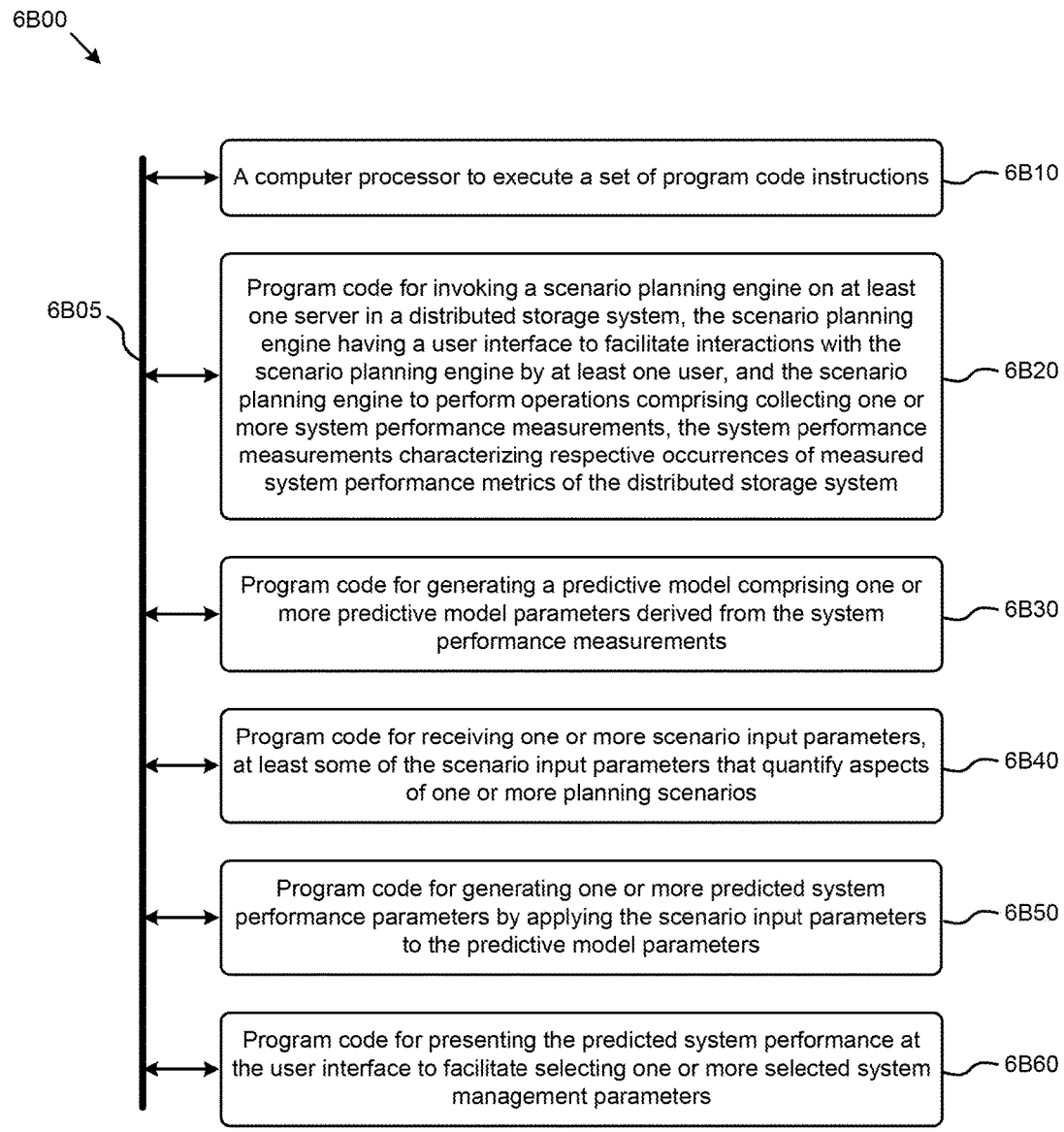

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (see module 6B10) and modules for accessing memory to hold program code instructions to perform: invoking a scenario planning engine on at least one server in a distributed storage system, the scenario planning engine having a user interface to facilitate interactions with the scenario planning engine by at least one user, and the scenario planning engine to perform operations comprising, collecting one or more system performance measurements, the system performance measurements characterizing respective occurrences of measured system performance metrics of the distributed storage system (see module 6B20); generating a predictive model comprising one or more predictive model parameters derived from the system performance measurements (see module 6B30); receiving one or more scenario input parameters (e.g., "what-if" input parameters), at least some of the scenario input parameters that quantify aspects of one or more planning scenarios (see module 6B40); generating one or more predicted system performance parameters by applying the scenario input parameters to the predictive model parameters (see module 6B50); and presenting the predicted system performance at the user interface to facilitate selecting one or more selected system management parameters (see module 6B60).

System Architecture Overview

Additional System Architecture Examples

Figure 7A:
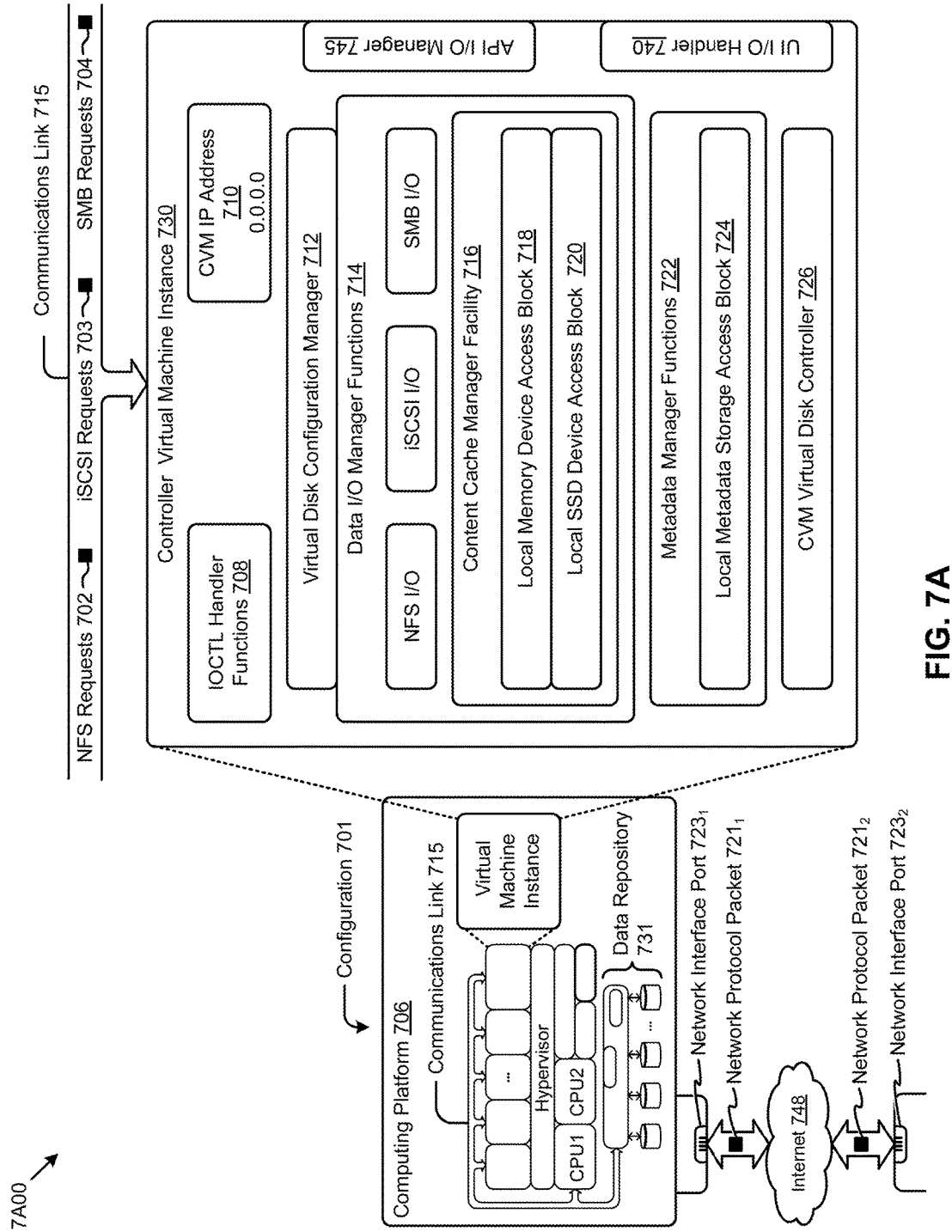
FIG. 7A and FIG. 7B depict architectures comprising collections of interconnected components suitable for implementing embodiments of the present disclosure and/or for use in the herein-described environments.

FIG. 7A depicts a virtualized controller as implemented by the shown virtual machine architecture 7A00. The virtual machine architecture comprises a collection of interconnected components suitable for implementing embodiments of the present disclosure and/or for use in the herein-described environments. Moreover, the shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (see IOCTL functions 708) that interface to other functions such as data IO manager functions 714 and/or metadata manager functions 722. As shown, the data IO manager functions can include communication with a virtual disk configuration manager 712 and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 730 includes a content cache manager facility 716 that accesses storage locations, possibly including local dynamic random access memory (DRAM) (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731 can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 701 can be coupled by a communications link 715 (e.g., backplane, LAN, PTSN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code) communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to storage infrastructure scenario planning.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate storage infrastructure scenario planning. Such files or records can be brought into and/or stored in volatile or non-volatile memory.

Figure 7B:
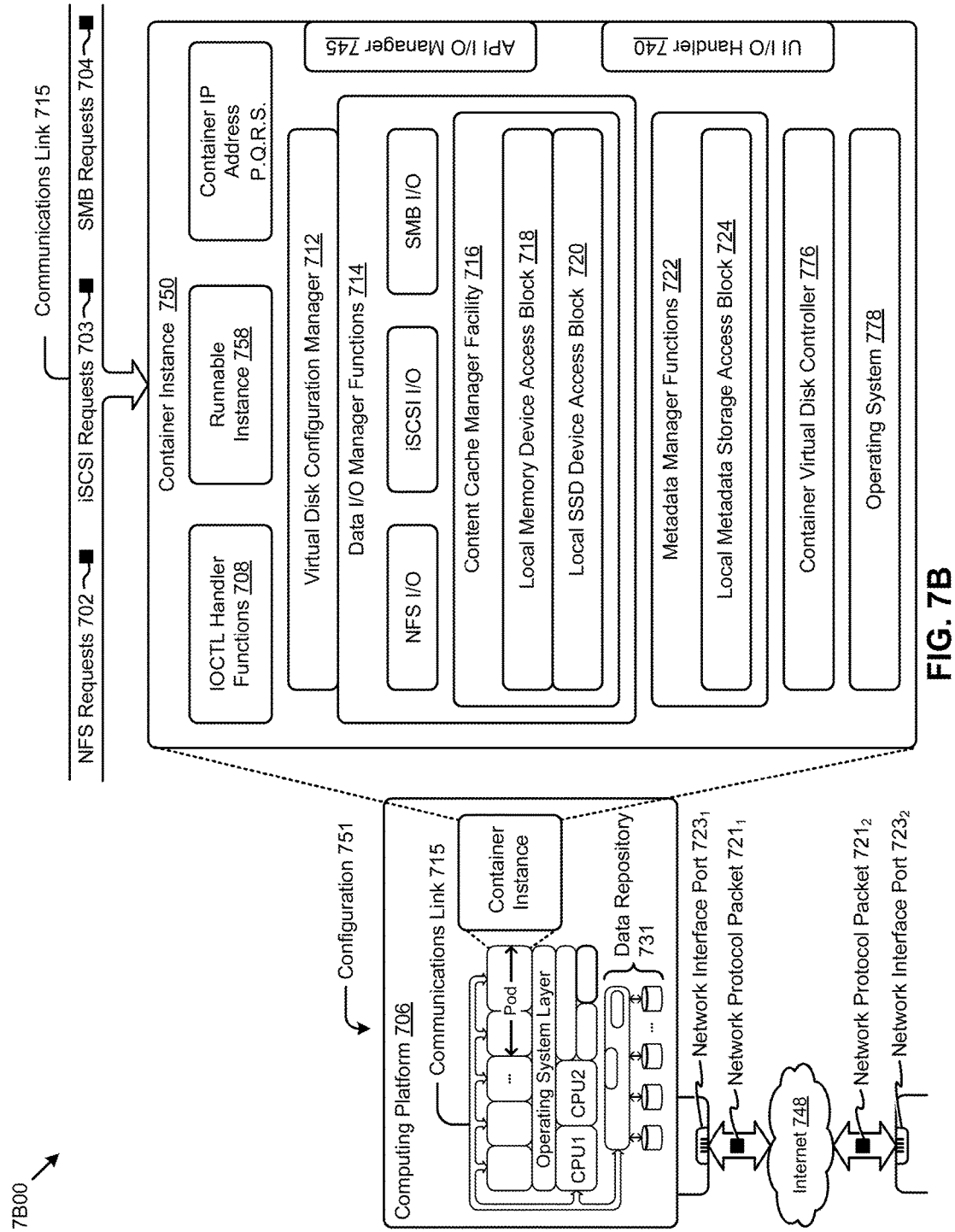

FIG. 7B depicts a virtualized controller implemented by a containerized architecture 7B00. The containerized architecture comprises a collection of interconnected components suitable for implementing embodiments of the present disclosure and/or for use in the herein-described environments. Moreover, the shown containerized architecture 7B00 includes a container instance in a configuration 751 that is further described as pertaining to the container instance 750. The configuration 751 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 750). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases a virtual machine configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container (e.g., a Docker container) can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
identifying a cluster in a distributed storage system, the cluster comprising one or more nodes, the distributed storage system comprising a storage pool having a first local storage on a first node of the one or more nodes and a second local storage on a second node of the one or more nodes, wherein the first node utilizes a first virtualized controller to manage storage and I/O activities on a plurality of storage devices in the storage pool and the second node utilizes a second virtualized controller to manage storage and I/O activities on the plurality of storage devices in the storage pool; and
implementing, on any node with a virtualized controller in the cluster of nodes, a scenario planning engine to manage the distributed storage system, the scenario planning engine having a user interface to facilitate interactions with the scenario planning engine by at least one user, and the scenario planning engine to perform operations comprising,
collecting one or more system performance measurements that are stored in any local storage in the storage pool, the system performance measurements characterizing respective occurrences of measured system performance metrics of the distributed storage system, wherein the storage pool is accessible by any virtualized controller on a node of the one or more nodes;
generating a predictive model comprising one or more predictive model parameters derived from the system performance measurements by accessing the system performance measurements stored in the storage pool;
receiving one or more scenario input parameters, at least some of the scenario input parameters that quantify aspects of one or more planning scenarios;
generating one or more predicted system performance parameters by applying the scenario input parameters to the predictive model parameters; and
presenting the one or more predicted system performance at the user interface to facilitate selecting one or more selected system management parameters.

2. The method of claim 1, wherein the one or more system performance measurements are derived from storage I/O commands issued by a user virtual machine and wherein the storage I/O commands are processed by a virtualized controller that accesses a storage pool.

3. The method of claim 1, further comprising determining one or more recommended plan parameters based at least in part on the predicted system performance parameters.

4. The method of claim 3, further comprising adjusting at least one of the scenario input parameters based on the recommended plan parameters.

5. The method of claim 3, wherein the determining the recommended plan parameters is based at least in part on one or more planning rules.

6. The method of claim 1, wherein the one or more predicted system performance parameters being used to simulate the one or more planning scenarios that identify a remediation plan if it is determined that the predicted system performance parameters exceeds a constraint, wherein the remediation plan generates one or more updated predicted system performance parameters by adjusting at least one of the scenario input parameters before applying the at least one adjusted scenario input parameter to the predictive model parameters.

7. The method of claim 1, wherein the scenario input parameters correspond to at least one of, a constraint, or an objective.

8. The method of claim 1, wherein the scenario input parameters are based at least in part on a target runway time period, or a recovery period objective time limit, or a maximum data loss limit, or a maximum storage utilization metric, or a maximum CPU utilization limit, or a minimum CPU headroom limit, or any combination thereof.

9. The method of claim 1, wherein at least one of, the measured system performance, or the predicted system performance, is characterized by a set of time series data.

10. The method of claim 1, wherein the selected system management parameters influence a behavior of the distributed storage system.

11. A computer readable medium, embodied in a non-transitory computer readable medium, the non-transitory computer readable medium having stored thereon a sequence of instructions which, when stored in memory and executed by a processor causes the processor to perform a set of acts, the acts comprising:
identifying a cluster in a distributed storage system, the cluster comprising one or more nodes, the distributed storage system comprising a storage pool having a first local storage on a first node of the one or more nodes and a second local storage on a second node of the one or more nodes, wherein the first node utilizes a first virtualized controller to manage storage and I/O activities on a plurality of storage devices in the storage pool and the second node utilizes a second virtualized controller to manage storage and I/O activities on the plurality of storage devices in the storage pool; and
implementing, on any node with a virtualized controller in the cluster of nodes, a scenario planning engine to manage the distributed storage system, the scenario planning engine having a user interface to facilitate interactions with the scenario planning engine by at least one user, and the scenario planning engine to perform operations comprising,
collecting one or more system performance measurements that are stored in any local storage in the storage pool, the system performance measurements characterizing respective occurrences of measured system performance metrics of the distributed storage system, wherein the storage pool is accessible by any virtualized controller on a node of the one or more nodes;

generating a predictive model comprising one or more predictive model parameters derived from the system performance measurements by accessing the system performance measurements stored in the storage pool;

receiving one or more scenario input parameters, at least some of the scenario input parameters that quantify aspects of one or more planning scenarios;

generating one or more predicted system performance parameters by applying the scenario input parameters to the predictive model parameters; and presenting the one or more predicted system performance at the user interface to facilitate selecting one or more selected system management parameters.

12. The computer readable medium of claim 11, further comprising instructions which, when stored in memory and executed by the processor causes the processor to perform acts of determining one or more recommended plan parameters based at least in part on the predicted system performance parameters.

13. The computer readable medium of claim 12, further comprising instructions which, when stored in memory and executed by the processor causes the processor to perform acts of adjusting at least one of the scenario input parameters based on the recommended plan parameters.

14. The computer readable medium of claim 12, wherein the determining the recommended plan parameters is based at least in part on one or more planning rules.

15. The computer readable medium of claim 14, wherein the planning rules comprise at least one remediation rule.

16. The computer readable medium of claim 11, wherein at least one of, the scenario input parameters, or the selected system management parameters, are selected by the user at the user interface of the scenario planning engine.

17. The computer readable medium of claim 11, wherein the scenario input parameters correspond to at least one of, a constraint, or an objective.

18. The computer readable medium of claim 11, wherein the scenario input parameters are based at least in part on a target runway time period, or a recovery period objective time limit, or a maximum data loss limit, or a maximum storage utilization metric, or a maximum CPU utilization limit, or a minimum CPU headroom limit, or any combination thereof.

19. A system comprising:
a storage medium having stored thereon a sequence of instructions; and
a processor or processors that execute the instructions to cause the processor or processors to perform a set of acts,
identifying a cluster in a distributed storage system, the cluster comprising one or more nodes, the distributed storage system comprising a storage pool having a first local storage on a first node of the one or more nodes and a second local storage on a second node of the one or more nodes, wherein the first node utilizes a first virtualized controller to manage storage and I/O activities on a plurality of storage devices in the storage pool and the second node utilizes a second virtualized controller to manage storage and I/O activities on the plurality of storage devices in the storage pool; and
implementing, on any node with a virtualized controller in the cluster of nodes, a scenario planning engine to manage the distributed storage system, the scenario planning engine having a user interface to facilitate interactions with the scenario planning engine by at least one user, and the scenario planning engine to perform operations comprising,
collecting one or more system performance measurements that are stored in any local storage in the storage pool, the system performance measurements characterizing respective occurrences of measured system performance metrics of the distributed storage system, wherein the storage pool is accessible by any virtualized controller on a node of the one or more nodes;
generating a predictive model comprising one or more predictive model parameters derived from the system performance measurements by accessing the system performance measurements stored in the storage pool;
receiving one or more scenario input parameters, at least some of the scenario input parameters that quantify aspects of one or more planning scenarios;
generating one or more predicted system performance parameters by applying the scenario input parameters to the predictive model parameters; and
presenting the one or more predicted system performance at the user interface to facilitate selecting one or more selected system management parameters.

20. The system of claim 19, wherein the scenario input parameters correspond to at least one of, a constraint, or an objective.

21. A method comprising:
receiving an input parameter at a user interface of a scenario planning engine, the scenario planning engine configured to manage a distributed storage system, the distributed storage system comprising a storage pool having a local storage on a node, wherein the node utilizes a virtualized controller to manage storage and I/O activities in the storage pool, wherein the virtualized controller comprises the scenario planning engine; and
applying, via the virtualized controller comprising the scenario planning engine, the input parameter to generate a predictive performance parameter characterizing a simulated scenario for the distributed storage system; and
presenting the predictive performance parameter at the user interface to facilitate selection of the simulated scenario, wherein the distributed storage system is configured based at least in part on the predictive performance parameter that corresponds to the simulated scenario selected.

22. The method of claim 21, further comprising determining a recommended plan parameter based at least in part on the predicted performance parameter.

23. The method of claim 22, further comprising adjusting the scenario input parameter based on the recommended plan parameter.

24. The method of claim 22, wherein the determining the recommended plan parameter is based at least in part on a planning rule.

25. A computer readable medium, embodied in a non-transitory computer readable medium, the non-transitory computer readable medium having stored thereon a sequence of instructions which, when stored in memory and executed by a processor causes the processor to perform a set of acts, the acts comprising:

receiving an input parameter at a user interface of a scenario planning engine, the scenario planning engine configured to manage a distributed storage system, the distributed storage system comprising a storage pool having a local storage on a node, wherein the node utilizes a virtualized controller to manage storage and I/O activities in the storage pool, wherein the virtualized controller comprises the scenario planning engine; and applying, via the virtualized controller comprising the scenario planning engine, the input parameter to generate a predictive performance parameter characterizing a simulated scenario for the distributed storage system; and presenting the predictive performance parameter at the user interface to facilitate selection of the simulated scenario, wherein the distributed storage system is configured based at least in part on the predictive performance parameter that corresponds to the simulated scenario selected.

26. The computer readable medium of claim 25, further comprising instructions which, when stored in memory and executed by the processor causes the processor to perform acts of determining a recommended plan parameter based at least in part on the predicted performance parameter.

27. The computer readable medium of claim 26, further comprising instructions which, when stored in memory and executed by the processor causes the processor to perform acts of adjusting the scenario input parameter based on the recommended plan parameter.

28. The computer readable medium of claim 26, wherein the determining the recommended plan parameter is based at least in part on a planning rule.

* * * * *